United States Patent [19]
Muraoka et al.

[11] Patent Number: 5,399,029
[45] Date of Patent: Mar. 21, 1995

[54] METHOD OF KERNING IN THE PROCESSING OF DOCUMENTS WRITTEN IN EUROPEAN LANGUAGES

[75] Inventors: Youichi Muraoka; Masahiko Hashimoto, both of Tokyo, Japan

[73] Assignee: Max Co., Ltd., Tokyo, Japan

[21] Appl. No.: 135,499

[22] Filed: Oct. 13, 1993

[30] Foreign Application Priority Data

Oct. 13, 1992 [JP] Japan .................................. 4-274595

[51] Int. Cl.⁶ .............................................. B41B 1/04
[52] U.S. Cl. ........................................ 400/9; 400/279; 400/3; 395/144
[58] Field of Search ..................... 400/2, 3, 9, 10, 279; 395/144, 145, 150, 151

[56] References Cited

U.S. PATENT DOCUMENTS

| | | | |
|---|---|---|---|
| 4,181,955 | 1/1980 | Mittelman et al. ................. | 395/114 |
| 4,225,249 | 9/1980 | Kettler et al. ........................ | 400/3 |
| 4,467,525 | 8/1984 | Logan et al. ......................... | 33/18.2 |
| 4,591,999 | 5/1986 | Logan .................................. | 395/150 |
| 4,833,627 | 5/1989 | Leszczynski ........................ | 395/145 |

FOREIGN PATENT DOCUMENTS

| | | | |
|---|---|---|---|
| 0042884 | 4/1981 | Japan ..................................... | 400/9 |
| 0178781 | 11/1982 | Japan ..................................... | 400/3 |
| 0202868 | 11/1984 | Japan ..................................... | 400/3 |
| 242073 | 9/1990 | Japan . | |

*Primary Examiner*—Edgar S. Burr
*Assistant Examiner*—Christopher A. Bennett
*Attorney, Agent, or Firm*—Cushman, Darby & Cushman

[57] ABSTRACT

Kerning information that allows font characters to contact the outlines of immediately preceding characters when the setting of character spaces is zero is set for the data on said font characters. The result of output with the setting of character spaces being zero is such that all font characters contact each other continuously. If the character space is set to a desired value greater than zero, a uniform space is provided between every font character. This insures that in a line of type such as where the letter "A" follows "W", the "A" is automatically kerned into the letter region of "W". As a result, the method of kerning in the processing of documents written in European languages is rationalized to obviate the need to perform calculations for setting letter spaces.

4 Claims, 3 Drawing Sheets

VACATION

WATER

FIG. 3(A)

VACATION

FIG. 3(B)

WATER

FIG. 4(A)

VACATION

FIG. 4(B)

WATER

METHOD OF KERNING IN THE PROCESSING OF DOCUMENTS WRITTEN IN EUROPEAN LANGUAGES

BACKGROUND OF THE INVENTION

This invention relates to a method of kerning that is applicable to the processing of documents in European languages so as to attain a balance between characters such as alphabetic letters, numerals and symbols.

When processing documents written in English and other European languages, the balance between typeset characters such as alphabetic letters, numerals and symbols must be considered and to this end, the space between specific character pairs is tightened up for adjustment of proportional spacing. This technique is commonly called "kerning", a typical application of which is where irregularly shaped characters such as "V" and "A" are involved; if they are typeset using normal spacing, they will appear to be too far apart and to enhance character fit, kerning is performed to have the "A" partly invade the letter region of "V".

Various kerning techniques are known in the computerized processing of documents in European languages; according to one method, the space between two characters is calculated at desired points (e.g., top, middle and bottom) and the sum or average of the calculated values is used as an index for determining the set width of each character; in another method, kerning information is preset in a character data memory. The function of the kerning information is backspacing by small amounts through several stages; a preset amount of cursor movement to the left is read out by a document processing means in accordance with the combination of specific letters in a character string and an appropriate kerning process is performed.

The kerning techniques just described above require that an appropriate set space be computed for each character or that the kerning information be read out in accordance with a specific combination of characters so as to achieve space setting. Thus, either method involves cumbersome processing while demanding a large burden on the processing equipment.

SUMMARY OF THE INVENTION

The present invention has been accomplished under these circumstances and has as an object providing a rationalized method by which characters can be automatically kerned through quantitative processing so as to increase the speed of processing while reducing the burden on the processing equipment.

This object of the present invention can be attained by a method of kerning in the processing of documents written in European languages, which method is characterized in that kerning information that allows the font characters for European languages such as alphabetic letters, numerals and symbols to contact immediately preceding characters when the character space is zero is set for the data on said font characters and that all font characters to be typeset are spaced apart uniformly in accordance with a desired setting of character space, whereby kerning is done automatically.

Kerning information that allows each of the font characters such as alphabetic letters, numerals and symbols to contact the outline of immediately preceding characters is set for the data on those characters. When an output is delivered with the character space being set for zero, all the font characters contact each other at either one or more pints. Take, for example, the case where two letters such as "V" and "A" that have inclined lines are put side by side in that order: the "A" lying behind is kerned to contact the letter region of "V". If the setting of letter space is greater than zero, all font characters are separated apart uniformly and kerning is done in accordance with the specific letter space setting.

BRIEF DESCRIPTION OF THE DRAWINGS

FIGS. 3(A) and 3(B) are illustrations of another embodiment of the present invention where a document processing output is delivered with the letter space being set for 10%;

FIGS. 4(A) and 4(B) are illustrations of still another embodiment of the present invention where a document processing output is delivered with the letter space being set for 15%.

DETAILED DESCRIPTION OF THE INVENTION

Figures 1, 2A, 2B:
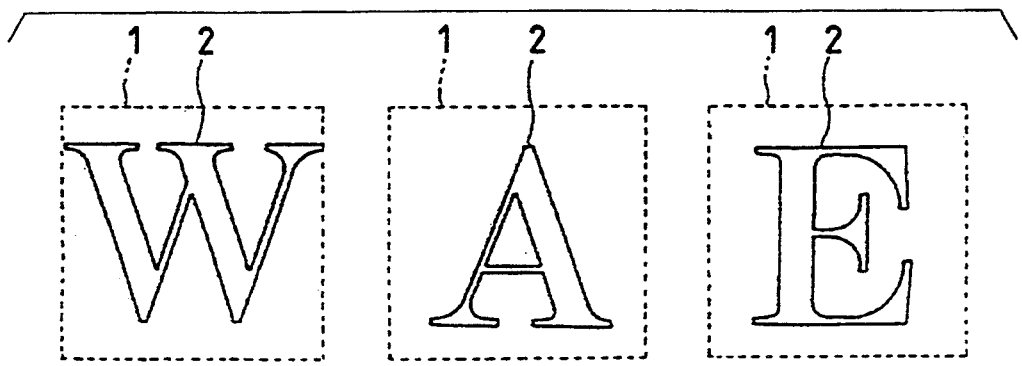
FIG. 1 is an illustration of three alphabetic font letters.
FIGS. 2(A) and 2(B) are illustrations of an embodiment of the present invention where a document processing output is delivered with the letter space being set for zero.

Embodiments of the present invention are described below with reference to the accompanying drawings. FIG. 1 is diagram showing the concept of three alphabetic font letters to be stored in a character data memory; character regions 1 bounded by dashed lines have character data 2 set therein by means of vectors of dots. Each alphabetic font letter has the settings of not only character data but also kerning information that is associated with a font letter that has a potential to be typeset immediately before. This kerning information is defined in such a way that the letter with its setting will contact the coordinates of the outline of an immediately preceding character at one or more points when the character space is zero percent. Hence, if the printing operation is executed with the character space being set at zero percent, an output is delivered with the individual alphabetic letters contacting each other as shown in FIGS. 2(A) and 2(B).

If the character space is set in the print control section at a desired proportion, say, 10% of a given reference value such as the character height, the respective alphabetic font letters will be typeset at spaces which are 10% of the character height as shown in FIGS. 3(A) and 3(B). FIGS. 4(A) and 4(B) show the case where the letter space is set for 15%. As shown in those figures, the results of output are substantially the same as those attained by the conventional kerning techniques in that the letter "A" following "W" or "V" partly invades their unit windows.

Figure 5:
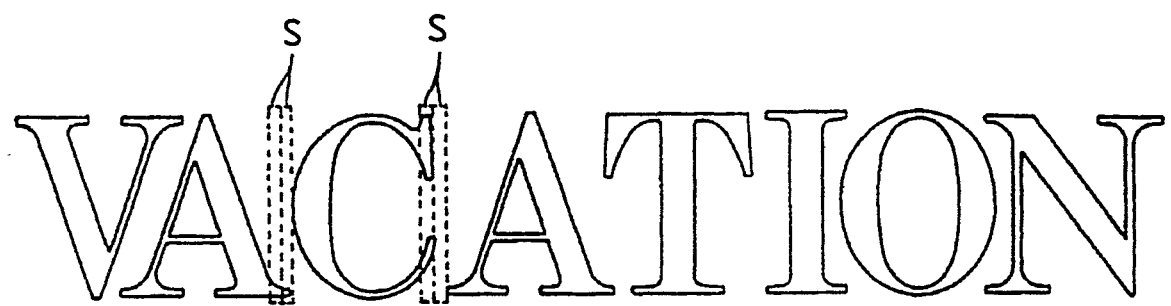
FIG. 5 is an illustration of yet another embodiment of the present invention where a document processing output is delivered with adjusting spaces being inserted to alter letter spaces.

If desired, the control section of a document processor may be furnished with a capability for inserting adjusting spaces that are small enough to be equal to about several percent of the character height and which can be inserted between characters by means of an input device such as a keyboard. This technique can advantageously be used if the result of outputting letter spaces as shown in FIGS. 3(A) and 3(B) or 4(A) and 4(B) is aesthetically unsatisfactory or it one wants a special effect; to this end, one may insert adjusting spaces S in desired positions between characters as shown in FIG. 5 so as to modify the associated letter spaces.

As described above in detail in connection with several embodiments of the present invention, kerning information that allows the font characters to contact immediately preceding characters when the letter space is set to zero is set for the data on said font characters and all characters to be typeset will be spaced apart uniformly in accordance with a desired setting of letter space. Hence, there is no need to perform cumbersome calculations to determine the distance from every character of interest to an immediately preceding character. Since kerning can be effected automatically through quantitative processing, the method of the present invention is not only rational enough to reduce the burden on computers but also practical enough to permit its implementation on word processors and the like.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A method of kerning in the processing of a document that includes thereon font characters, which are produced in European languages, comprising the steps of:
    setting kerning information so as to allow each of the font characters for the document to contact an immediately preceding one of the font characters;
    bringing each of the font characters into contact with the preceding font character in accordance with said kerning information;
    setting a desired character spacing by adjusting a distance between at least one of the font characters and the font character that precedes the at least one of the font characters, wherein the desired character spacing is zero when the at least one of the font characters is brought into contact with the font character that precedes that at least one font character; and
    uniformly spacing each of the font characters in accordance with the desired character spacing.

2. A method of kerning according to claim 1, further comprising the step of:
    modifying the spacing between a selected one of the font characters and the font character that precedes the selected font character by inserting an adjusting space between the selected one of the font characters and the font character that precedes the selected one of the font characters.

3. A method of kerning according to claim 1, wherein the desired character spacing is set so as to be in proportion to a character height of the font characters.

4. A method of kerning according to claim 1, wherein the font characters include alphabetic letters, numerals and symbols.

* * * * *